(12) United States Patent  
Srivastava

(10) Patent No.: US 11,704,274 B2  
(45) Date of Patent: *Jul. 18, 2023

(54) SYSTEM, APPARATUS AND METHOD FOR EXTENDED COMMUNICATION MODES FOR A MULTI-DROP INTERCONNECT

(71) Applicant: Intel Corporation, Santa Clara, CA (US)

(72) Inventor: Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/479,001

(22) Filed: Sep. 20, 2021

(65) Prior Publication Data

US 2022/0004516 A1 Jan. 6, 2022

Related U.S. Application Data

(63) Continuation of application No. 15/627,735, filed on Jun. 20, 2017, now Pat. No. 11,132,323.

(51) Int. Cl.
*G06F 13/40* (2006.01)
*G06F 13/38* (2006.01)
*G06F 13/42* (2006.01)

(52) U.S. Cl.
CPC ........ *G06F 13/4086* (2013.01); *G06F 13/385* (2013.01); *G06F 13/4045* (2013.01); *G06F 13/4068* (2013.01); *G06F 13/4291* (2013.01)

(58) Field of Classification Search
None
See application file for complete search history.

(56) References Cited

U.S. PATENT DOCUMENTS

| | | |
|---|---|---|
| 8,037,270 B2 | 10/2011 | Bartley et al. |
| 8,269,622 B2 | 9/2012 | Chan et al. |
| 8,296,469 B2 | 10/2012 | Dunstan et al. |
| 8,321,650 B2 | 11/2012 | Steinmetz et al. |
| 8,975,975 B2 | 3/2015 | Schrom et al. |
| 9,270,326 B2 | 2/2016 | Kesling et al. |
| 9,432,298 B1 | 8/2016 | Smith |
| 9,996,483 B2 | 6/2018 | Pitigoi-Aron |
| 10,140,242 B2 | 11/2018 | Mishra et al. |
| 10,241,536 B2 | 3/2019 | Quiet et al. |

(Continued)

OTHER PUBLICATIONS

MIPI Alliance, "Specification Brief, Audio & Control: SLIMbus®, SoundWireSM," Oct. 76, 2014, 1 pg.

*Primary Examiner* — Henry Tsai
*Assistant Examiner* — Christopher A Bartels
(74) *Attorney, Agent, or Firm* — Trop, Pruner & Hu, P.C.

(57) ABSTRACT

In one embodiment, an apparatus includes a host controller to couple to an interconnect to which a plurality of devices may be coupled. The host controller may include: a first driver to drive first information onto a first line of the interconnect; a second driver to drive a clock signal onto a second line of the interconnect; and a mode control circuit to cause the second driver to drive the clock signal onto the second line of the interconnect in a first mode and to cause the first driver and the second driver to drive differential information onto the first line and the second line of the interconnect in a second mode. Other embodiments are described and claimed.

20 Claims, 12 Drawing Sheets

(56) References Cited

U.S. PATENT DOCUMENTS

| | | |
|---|---|---|
| 10,489,337 B2 | 11/2019 | Quiet |
| 10,579,581 B2 * | 3/2020 | Pitigoi-Aron ....... G06F 13/4291 |
| 10,855,367 B2 | 12/2020 | Junk et al. |
| 10,872,049 B2 | 12/2020 | Kessler et al. |
| 2016/0299855 A1 * | 10/2016 | Pitigoi-Aron ....... G06F 13/4295 |
| 2017/0041688 A1 * | 2/2017 | Pitigoi-Aron ............. G06F 1/08 |
| 2017/0075852 A1 * | 3/2017 | Mishra ................ G06F 13/4282 |
| 2017/0255588 A1 | 9/2017 | Pitigoi-Aron |
| 2018/0052791 A1 | 2/2018 | Srivastava et al. |
| 2018/0181532 A1 | 6/2018 | Pitigoi-Aron |
| 2018/0367504 A1 | 12/2018 | Srivastava |
| 2020/0106743 A1 | 4/2020 | Park et al. |
| 2022/0123987 A1 * | 4/2022 | Mishra .................. H04L 1/0063 |

\* cited by examiner

SYSTEM, APPARATUS AND METHOD FOR EXTENDED COMMUNICATION MODES FOR A MULTI-DROP INTERCONNECT

CROSS-REFERENCE TO RELATED APPLICATION

The present application is a continuation of U.S. patent application Ser. No. 15/627,735, filed on Jun. 20, 2017, the content of which is hereby incorporated by reference.

TECHNICAL FIELD

Embodiments relate to communication via multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller.

DETAILED DESCRIPTION

In various embodiments, techniques are provided to realize flexibility in communications along an interconnect such as a multi-drop bus by allowing devices to communicate according to multiple communication protocols and/or extensions to a given communication protocol. In particular embodiments described herein, by way of multiplexing and/or tunneling, information can be communicated on a bus, configured according to a native communication protocol for single-ended data communication with a corresponding clock signal, at potentially higher speeds than currently supported native modes and/or differentially. In a particular embodiment for use with an I3C-based bus, native communications may be single-ended along a data line of the bus, where these data communications can be sent in concert with a clock signal along a clock line of the bus (or alternately additional data via this clock line). For differential communications, the clock line instead can be leveraged for differential data communication according to an extension to this native communication protocol. While the particular embodiment described herein is directed to communicating audio information according to an extension to an I3C communication protocol, understand the scope of the present invention is not limited in this regard and in other cases, other types of data communications may be performed in a tunneled and/or multiplexed manner at different speeds and modes (e.g., differentially) and at potential lower voltage swings than a given native communication protocol.

In this way, a system/system on chip (SoC) designer is afforded with greater flexibility and ease of integration for providing additional functionality within a given platform. Still further, embodiments enable support of multiple protocols and functionality without impacting actual bus functionality, and provide scalability for extension to other communication protocols. As will be described herein, increased flexibility is realized for a designer of an SoC or other processor by supporting various other protocols over a multi-drop bus such as a sensor bus. In this way, reduced pin counts and bills of materials are realized. For example, to handle N communication protocols, a reduced amount of pins is realized by reusing pins so that an additional 2N+1 pins (where N is the number of communication protocols and one for an interrupt pin) can be avoided. To enable the communications as described herein, in some embodiments a main master may communicate to various devices on the bus, e.g., by a broadcast command, before entering into this extended mode.

Figure 1:
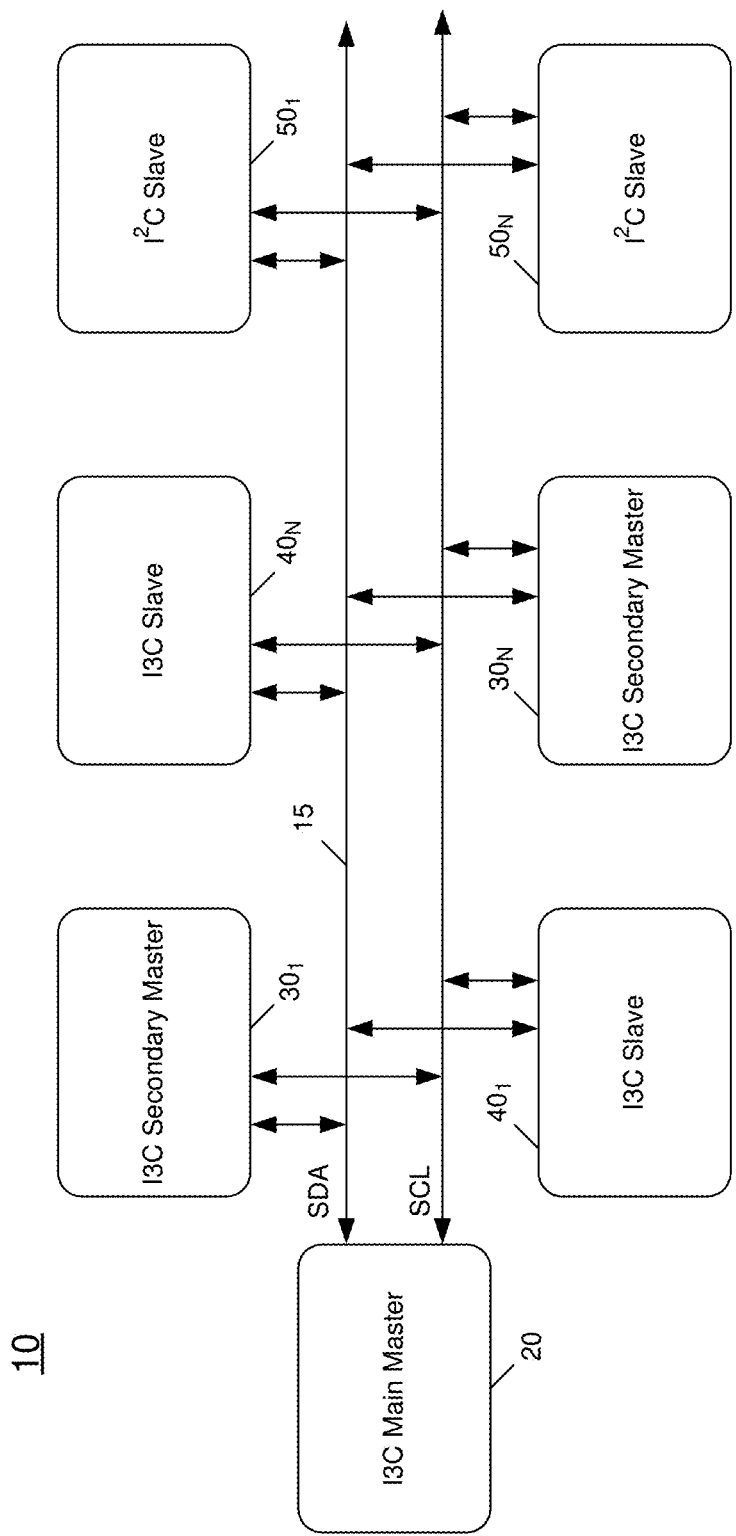
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with a given I3C specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware logic to act as a bus master for bus 15. Master device 20 may include a controller (not shown in the high level view of FIG. 1) to control data (SDA) and clock (SCL), as well as use (e.g.,) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other SoC, application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware logic, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bidirectional manner and clock communication can occur in a single direction. Further as described herein in some modes of operation, data signaling may occur on both clock and data lines, without communication of a separate clock signal. In some instances, this data communication can be differential communication of, e.g., future camera sideband low resolution differential data or future generation touch sensor data, but not limited to these other applications.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20 known as a secondary master). As will be described herein one or more such secondary master devices 30 may be controlled to act as bus master for bus 15 while main master device 20 is in a low power state, to enable bus operations to continue to proceed while in this low power state.

As further illustrated in FIG. 1, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices, audio devices or so forth. Still further, in some embodiments additional devices may couple to bus 15, including legacy I²C devices, including I²C slave devices $50_1$-$50n$. Such devices can communicate via bus 15 according to a given I²C communication protocol, but may not be configured to comprehend signaling according to an I3C communication protocol. Understand while shown at this high level in the embodiment of FIG. 1, many variations and alternatives are possible.

According to the current I3C specification, there are three modes of bus operation: a high data rate (HDR) mode (both data and clock (SDA/SCL) lines communicate as single-ended data), double data rate (DDR) (one line (SDA) communicates DDR single-ended data and the other line (SCL) communicates a single-ended clock signal) and single data rate (SDR) (one line data and one line clock) operating at 12.5 Megabits per second (Mbps), with a limited platform topology (e.g., ranging from short to mid-range).

Example use cases for an I3C bus include camera imaging such as MIPI Gen4 camera serial interface (CSI2) for a camera command interface (CCI), which calls for using the I3C bus as a sideband communication technique, or always on (AON) imaging, e.g., for automotive or Internet of Things (IoT) applications. Similarly future generation touch sensors may use the I3C bus for sideband communication. Such applications may seek higher throughput rates than the currently available SDR modes (12.5 Mbps) and HDR modes at speeds more than 38 Mbps. In addition, a standard I3C bus may not be able support long reaches (e.g., 1 meter (m) for IoT systems and more for automotive space or some client segment spaces). To meet future generation applications (e.g., camera CCI/AON applications targeted for IoT/automotive segments, future generation touch sensors), embodiments provide a new communication mode, referred to herein as super high data rate (SHDR), which provides higher throughput and more reliable communication, with the ability to support long reach solutions and I²C backwards compatibility. To realize these extensions, embodiments provide a control flow to enter in this SHDR mode, along with data packet entry and exit flows and enhanced signal communications.

In a particular embodiment, to meet higher data rate requirements of devices such as a camera or other sensor device having a CCI/AON or future generation touch sensor requirement, a native communication protocol of an interconnect can be extended to accommodate higher data rates and an enhanced signaling mode. In one example, the above-mentioned SHDR mode is provided for an I3C bus. In an embodiment a special command code may be sent to trigger such burst mode signal operation and special commands may be used for entry and exit packets in this mode. Still further, in at least some embodiments this SHDR communication mode between a master and slave devices may be a differential signaling mode communicating a differential signal with a low voltage swing level, which can be transparent to devices coupled to the interconnect that lack the capability of this mode (e.g., I²C and SDR-only devices or HDR mode devices), as these devices will always read logic low levels during these extended communications.

Figure 2:
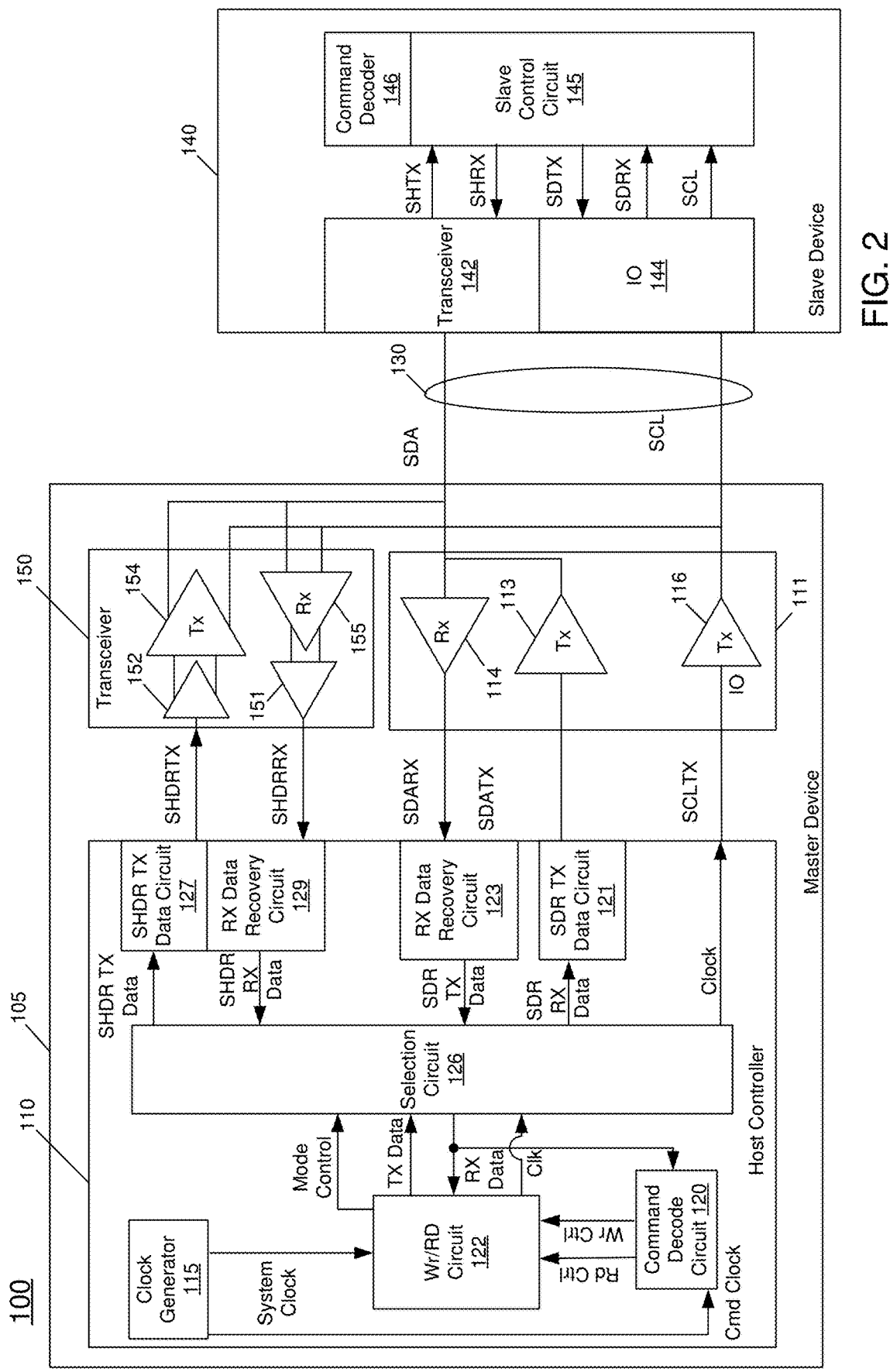
FIG. 2 is a block diagram of a system in accordance with an embodiment of the present invention.

Referring now to FIG. 2, shown is a block diagram of a system in accordance with an embodiment of the present invention. As shown in FIG. 2, a portion of a system 100 includes a main master 105 including a host controller 110 coupled to a device 140 via a multi-drop bus 130. As further illustrated, main master 105 includes an input/output (I/O) section 111 and a transceiver section 150. Device 140 (also referred to herein as a "slave") may be any type of device having given operational characteristics and also capabilities for being added/removed from bus 130. Understand that while in FIG. 2, only a single slave device 140 is shown coupled to bus 130, in many implementations multiple devices couple to bus 130, which is a multi-drop bus.

As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in a bi-directional manner and clock communications can occur in a unidirectional manner. In addition as described herein in some cases by way of tunneling and/or multiplexing, enhanced I3C mode communications or communications of other protocols may occur in a manner in which data may further be communicated, e.g., differentially, on the clock interconnect.

At the high level illustrated in FIG. 2, understand that device 140 may be one of many different devices, such as a device that is, inter alia, always powered on and present as being coupled to bus 130, such as a given type of sensor, such as an accelerometer or other sensor which may be incorporated in a given system (such as a smartphone or other mobile platform). For purposes of discussion herein, assume that device 140 operates as a slave to host controller 110 (but may also be configured as a secondary bus master).

In other cases, device 140 may be powered when it is to be active. As an example, device 140 may be another type of sensor, such as a camera device. In such example, device 140 may be powered on only when a camera functionality of the system is active. In other cases device 140 may be a slave device that can be physically added/removed via a hot plug or hot unplug operation, such as a cable, card, or external peripheral device that is coupled to bus 130, e.g., by a cable, external connection or so forth. In still other cases, device 140 may be coupled via an in-box cable.

As illustrated in FIG. 2, host controller 110 includes a write/read circuit 122. Such circuit may, depending upon a mode of control, prepare data for transmission from host controller 110 or may receive incoming data to be provided to one or more processing circuits (not shown in FIG. 2). Note that such one or more processing circuits may provide the data to be transmitted from host controller 110. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In implementations, incoming information to write/read circuit 122 may be of another communication protocol such that communications directed towards bus 130 may be tunneled and/or multiplexed as described herein.

Host controller 110 further includes a clock generator 115 to provide a clock signal (and/or to receive a clock signal, in implementations for certain buses) to a clock line of bus 130 via corresponding driver 116. In various embodiments, clock generator 115 may be configured to provide additional clock signals for use in host controller 110.

As further illustrated, host controller 110 includes a command decode circuit 120, which may act as a mode control circuit. Command decode circuit 120 is configured to dynamically control communications on bus 130 for a desired mode of operation, e.g., based at least in part on a received command for a desired mode. As described herein, these modes of operation may include different flavors or speeds of an I3C protocol, or an extension thereto such as the high speed differential communications discussed herein. Still further it is possible for other communication protocols to be supported along bus 130 by appropriate tunneling and/or multiplexing.

In embodiments, command decode circuit 120 may include a capabilities storage to store capability information both as to the capabilities of host controller 110 itself and the capabilities of devices coupled to bus 130. Of interest here, in response to device discovery communications, capabilities information of device 140 may be received and stored in corresponding entries of the capabilities storage. Such information may include at least one field to indicate whether a given device 140 is capable of differential high speed communications as discussed herein.

Write/read circuit 122 (which may include independent read and write control circuits) may, depending upon control provided by command decode circuit 120, dynamically adapt communications to be single ended or differential, and may further adapt the communication to occur at different frequencies and/or voltages, including differential low voltage swing signaling as described herein.

To further effect communication according to different modes dynamically, command decode circuit 120 couples to a selection circuit 126. Selection circuit 126 may include multiplexer and/or demultiplexer circuitry to enable dynamic switching of communication modes such that differential data may be communicated via both the data and clock lines of bus 130 and similarly, differential data received via these clock and bus lines can be appropriately handled. Understand while shown at this high level in the embodiment of FIG. 2, many variations and alternatives are possible.

As further illustrated in FIG. 2, host controller 110 further includes various transmitter/receiver circuitry to enable communication of information. More particularly, to enable communication of information between host controller 110 and transceiver section 150 and IO section 111, a plurality of transmitter/receiver/recovery circuits are provided. More specifically, for typical data communications via bus 130 of single ended-data, an SDR transmit data circuit 121 is provided for outgoing data, and in turn a receiver data recovery circuit 123 is provided for receipt of SDR data. In turn, for communication of differential high speed data, an SHDR transmit data circuit 127 is provided for outgoing differential data, and in turn a receiver data recovery circuit 129 is provided for receipt of SHDR data.

As further illustrated, for single-ended communications, single-ended data from SDR transmit data circuit 121 is provided via a transceiver 113 along the data line of bus 130, while in turn a clock signal is provided via a transceiver 116 along the clock line of bus 130. Further for incoming data received via the data line, a receiver 114 also couples to receiver data recovery circuit 123. In turn, transceiver section 150 includes a differential transmitter 154 that receives differential information for transmission via both clock and data lines of bus 130, as received from a converter 152, which manipulates incoming single-ended data into differential data. In turn, transceiver section 150 further includes a differential receiver 155 that receives differential information from bus 130, and sends it to a converter 151 for conversion to single-ended data.

While not discussed in detail herein, understand that slave/secondary masters 140 may similarly include a slave control circuit 145 (which in embodiments may itself include multiplexer/demultiplexer circuitry) to enable this dynamic control of communications to occur in single-ended and/or differential modes based on control of a command decoder 146. As further illustrated, slave device 140 further includes a transceiver section 142 and an IO section 144, which may generally be configured similar to the same sections shown in master device 105.

Figure 3A:
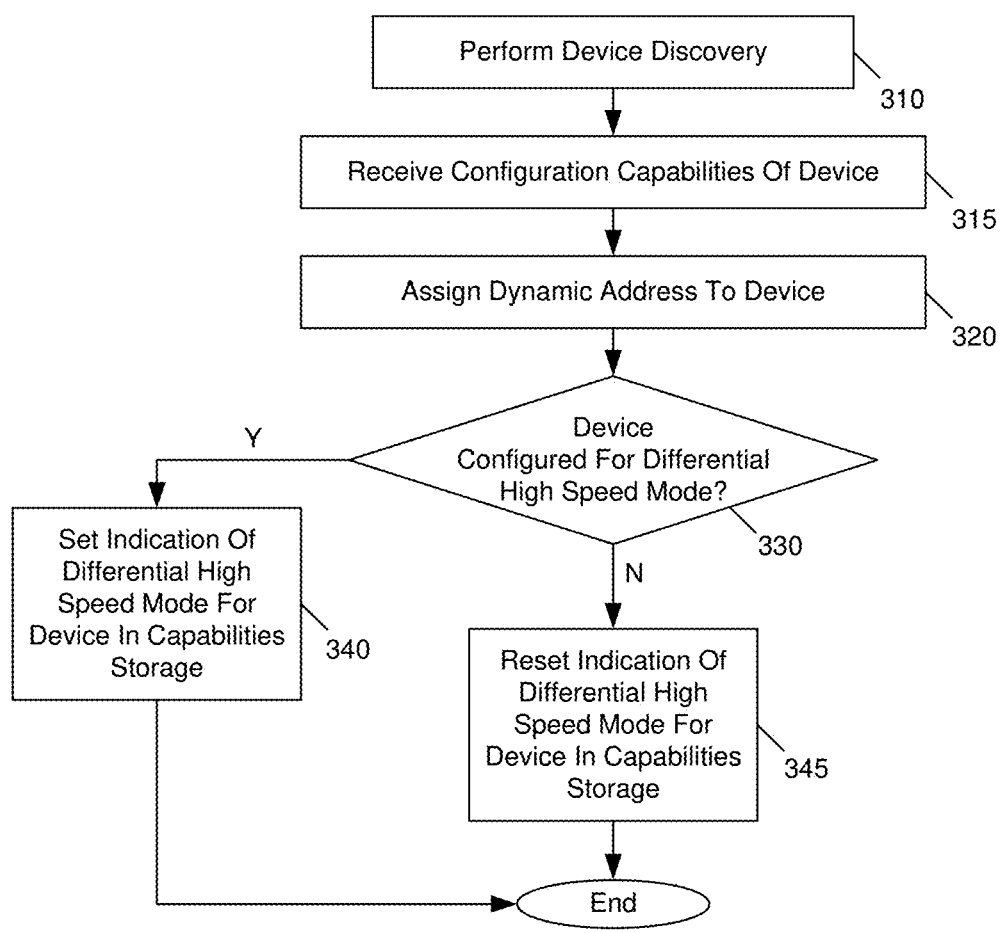
FIG. 3A is a flow diagram of a method in accordance with an embodiment of the present invention.

Referring now to FIG. 3A, shown is a flow diagram of a method in accordance with an embodiment of the present invention. More specifically, method 300 may be performed by a bus master for a bus as described herein. Accordingly, method 300 may be performed by hardware circuitry, software, firmware and/or combinations thereof.

As illustrated, method 300, which may be used to discover devices coupled to a bus and determine their capabilities, begins by performing device discovery (block 310). Various communications including broadcast messages can be sent along the bus to perform this device discovery. For a given device, method 300 proceeds to receive configuration capabilities of the device (block 315). Note that such capabilities may include various communication capabilities, including bus speeds, type of device and so forth. Of note herein, the capability information may include information as to whether the device is capable of communicating differentially according to a differential high speed mode. Furthermore, in instances where such differential communication may be at different communication speeds, a maximum bus speed also may be included in the capability information. Still further, the capability information also may indicate that the device is capable of receiving and handling incoming information at low voltage swings as discussed herein. In a particular embodiment, a field of a capabilities message may include one or more indicators to indicate that a given device is capable of performing communication according to a differential high speed communication extension to a given communication protocol (e.g., an I3C protocol). Next at block 320 a dynamic address is assigned to the device. Note that this order of operations between receipt of the configuration information and dynamic address assignment process may be vice-versa in other cases.

Still with reference to FIG. 3A, at diamond 330 it is determined whether the device is configured for a differential high speed mode. As described herein this determination may be based on one or more indicators of the received configuration capabilities. If it is determined that the device is configured for this differential high speed mode, control passes to block 340 where an indication can be set in a capabilities storage of the bus master. For example, a set bit or mode configuration within a mode field of the capabilities storage can be set to indicate this capability. Instead, when it is determined that the device is not configured to handle differential high speed mode communications, the indication can be reset in the capabilities storage, e.g., a reset bit within the mode field (block 345). Note that configuration for various modes may depend on sensing activity availability or applications processor or system software calls, in embodiments. Understand while shown at this high level in the embodiment of FIG. 3A, many variations and alternatives are possible.

Figure 3B:
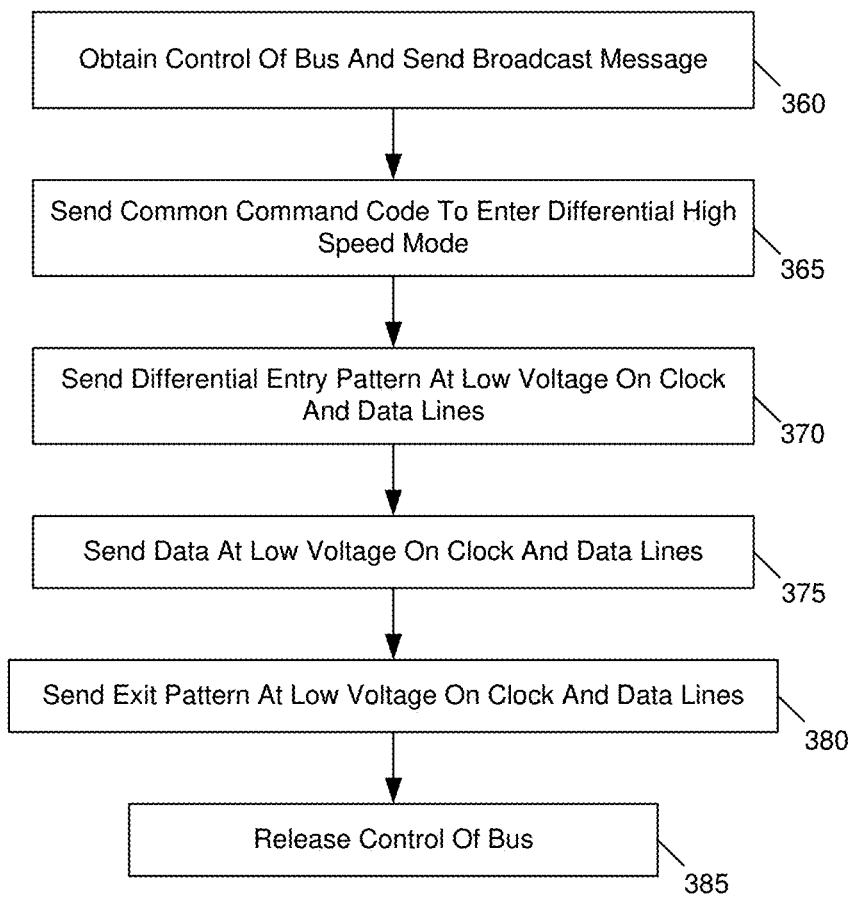
FIG. 3B is a flow diagram of a method in accordance with another embodiment of the present invention.

Referring now to FIG. 3B, shown is a flow diagram of a method in accordance with another embodiment of the present invention. More specifically, method 350 may be performed by a bus controller such as implemented in a master or slave device that seeks to initiate a differential high speed communication along the bus. As such, method 350 may be performed by hardware circuitry, software, firmware and/or combinations thereof.

As illustrated, method 350 begins by obtaining control of the bus and sending a broadcast message (block 360). Understand that bus control may be obtained by pulling a data line of the bus low. Thereafter one or more devices may in turn pull the clock line low to act as an acknowledgement of this control of the bus. After this operation, the bus controller sends a broadcast message. This broadcast message is used to indicate to slave devices the type of message that a master is to send a given (e.g., critical) information, before the communication is begun.

Next control passes to block 365 where a common command code is sent along the bus (e.g., directly to the target device or as a broadcast to all connected devices). This common command code may be a predetermined value corresponding to a command to one or more capable devices to enter the differential high speed mode. Note that this command code may be sent according to the native communication protocol, e.g., along the data line with a corresponding clock signal sent along the clock line. In addition, this communication may be at low speed and at normal bus voltage (such that logic low values have a voltage below a low voltage threshold for the bus and in turn logic high values have a voltage above a high voltage threshold for the bus). With such signaling, devices that do not support special command detection or HDR or SDR modes will not be able to respond or interrupt the bus. This is so, as such devices operate based on toggling of the SDA and SCL lines, including logic high values. But here the bus will not communicate logic high values during this differential high speed mode, and always appears at logic low levels, so these devices will not be able to interrupt the bus, and thus communication is safe from interruption in this mode. Devices that support this special mode detect the special command and request bus access by sending the addresses and capability. Only those devices having this capability will respond, and other devices do not do anything. If two devices seek to enter into the super high data rate mode, a given one of the devices having a higher priority address will win the bus arbitration. If the host controller is to start communication in super high data rate mode, then the host controller sends a direct message (including an address of a specific device) to particular devices. Only devices whose address matched with their address participate in this process.

After this communication, the bus is ready for operation in the differential high speed mode. As seen, control passes to block 370 where a differential entry pattern is sent on both clock and data lines of the interconnect. Note that this entry pattern may be a predetermined bit sequence or packet that acts as a notification to a target device that a data communication is to begin. As such, control next passes to block 375 where the data is sent differentially at low voltage on both the clock and data lines. When the data communication has completed, control passes to block 380 where an exit pattern or packet is sent differentially at low voltage on the clock and data lines, indicating an end of the message. This exit pattern is thus a predetermined bit sequence that acts as a notification to the target device that the data communication is to end. At this point after communication of the exit pattern, control passes to block 385 where control of the bus may be released. In an embodiment, the bus may be released by allowing the data line to be raised and maintained at a high voltage level (e.g., VDD).

Figure 4A:
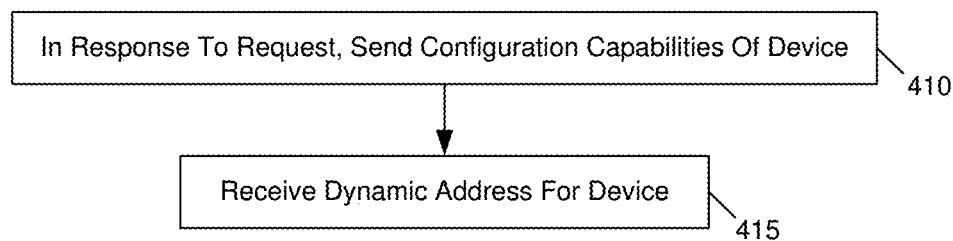
FIG. 4A is a flow diagram of a method in accordance with yet another embodiment of the present invention.

Referring now to FIG. 4A, shown is a flow diagram of a method in accordance with yet another embodiment of the present invention. More specifically FIG. 4A shows a method for configuring a device coupled to a bus. As such, method 400 may be performed by hardware circuitry, software, firmware and/or combinations thereof. As illustrated, method 400 begins by sending configuration capabilities of the device to a requester (block 410). More specifically, in response to a request for configuration information, e.g., received from a master device, a given device may send its configuration capabilities. Such configuration capabilities may be stored in a capabilities storage of the device and may include information as discussed above, namely supported modes, bus speeds and so forth. Thereafter at block 415 the device receives a dynamic address. This dynamic address may be stored in an address storage of the device and can be used during operation to identify when a message is directed to the device as a target. While shown at this high level in the embodiment of FIG. 4A understand that various additional configuration operations may occur for a given device.

Figure 4B:
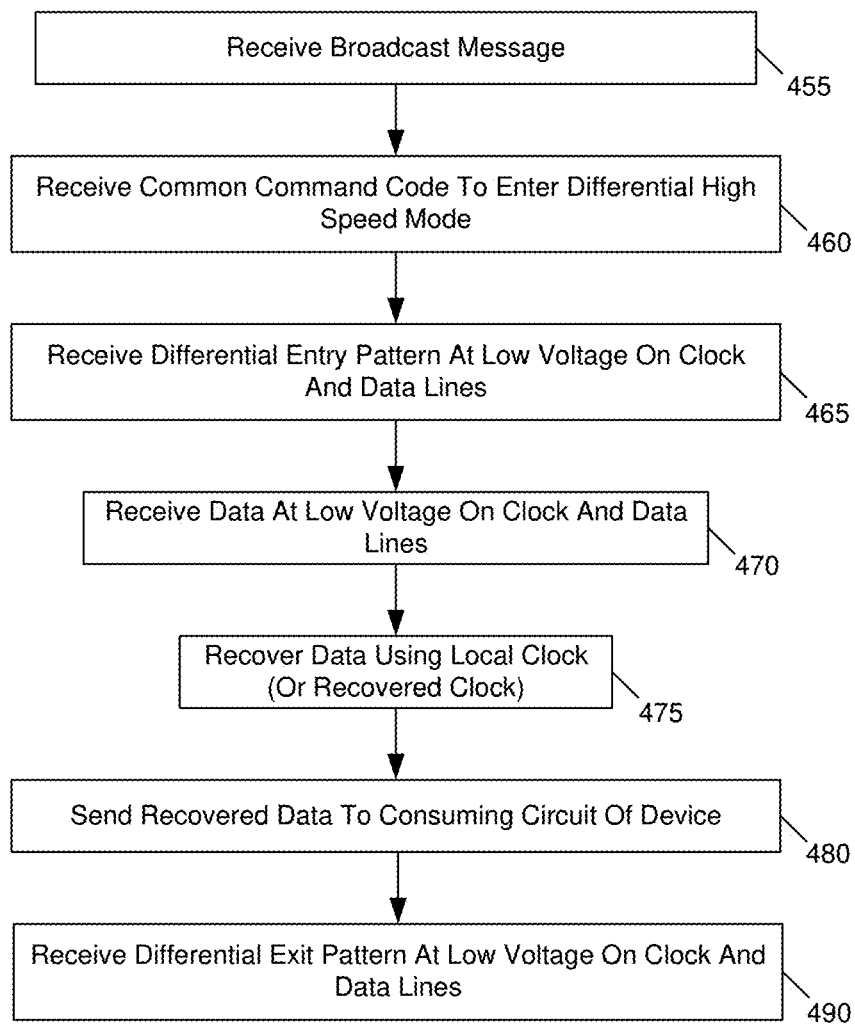
FIG. 4B is a flow diagram of a method in accordance with a still further embodiment of the present invention.

Referring now to FIG. 4B, shown is a flow diagram of a method in accordance with a still further embodiment of the present invention. More specifically, method 450 of FIG. 4B may be used to receive a communication in a differential high speed mode as described herein. As such, method 450 may be performed by hardware circuitry, software, firmware and/or combinations thereof.

As illustrated, method 450 begins by receiving a broadcast message (block 455). This broadcast message may be received from a master to indicate that it has control of the bus and is to begin a communication. Thereafter, a common command code may be received to enter the differential high speed mode (block 460). At this point, the device may configure itself for handling differential high speed mode communications. For example, various threshold voltages for discriminating incoming information (to be either logic one or zero values) may be updated to comprehend the low voltage swing signaling. To this end, embodiments may include different comparator circuitry and/or dynamic reference voltage control. Next at block 465 a differential entry pattern is received at low voltage on the clock and data lines. This predetermined entry pattern thus allows the device to identify the beginning of an incoming differential high speed message. Then a differential high speed message including data is received at low voltage on the clock and data lines (block 470). Thereafter, the data may be recovered using a local clock (block 475). That is, as there is no communicated clock in this instance, a local clock of the device may be used to recover the data. In yet other cases such as where the device does not include appropriate clock generation capabilities, a clock signal may be recovered from the data itself. In any event, the recovered data is sent to a consuming circuit of the device (block 480). At the end of a data communication, a differential exit pattern is received at low voltage on the clock and data lines to enable the device to identify the end of the differential high speed message (block 490). Understand while shown at this high level in the embodiment of FIG. 4B, many variations and alternatives are possible.

Figure 5:
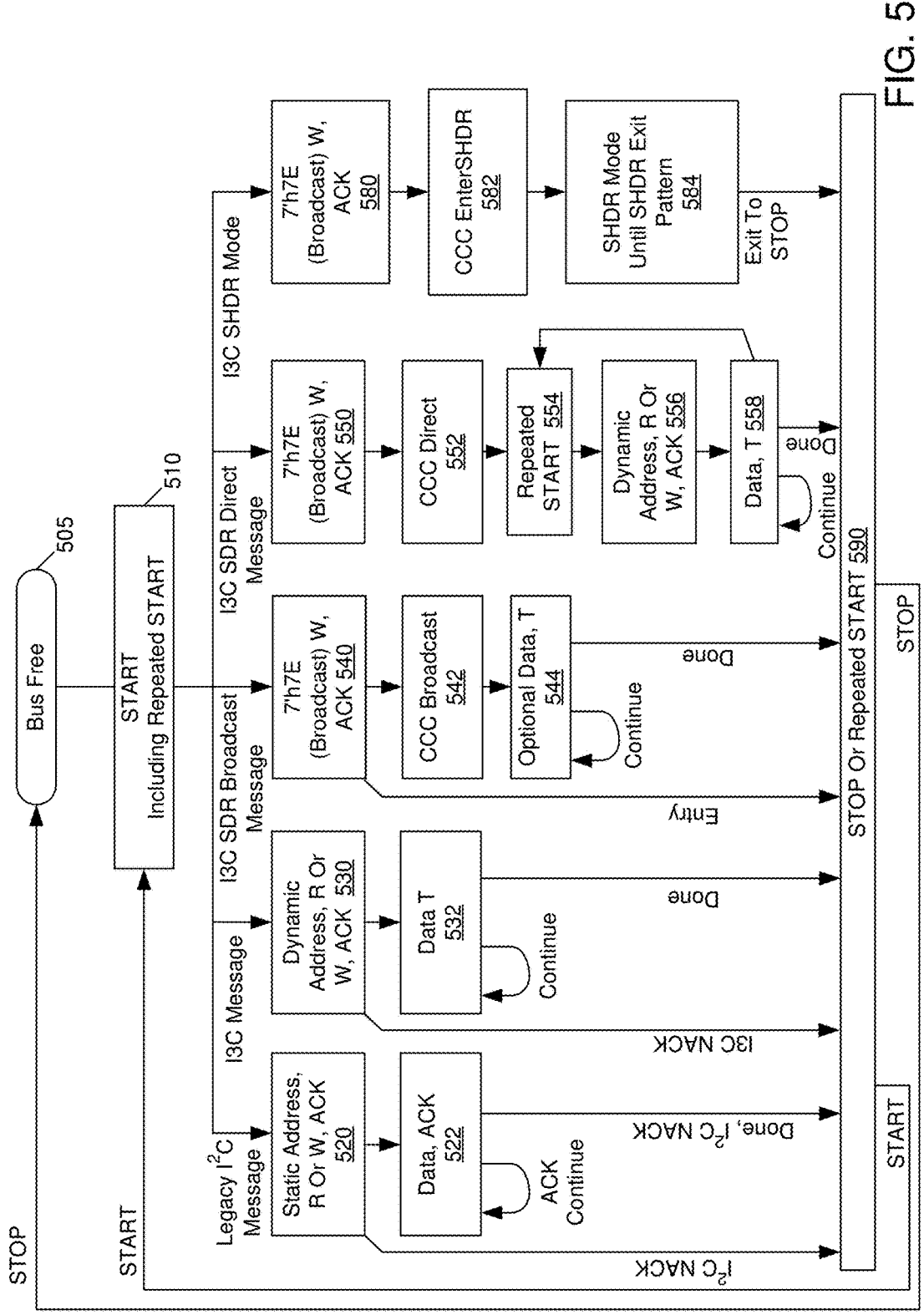
FIG. 5 is a flow diagram of a method for communicating across a bus in accordance with one embodiment of the present invention.

Referring now to FIG. 5, shown is a flow diagram of communications on a multi-drop bus across a bus such an I3C bus. Method 500 may be performed by any device capable of communicating on the bus, when it acts in a master mode to communicate information to one or more other devices coupled to it via the bus. As illustrated, method 500 begins at block 505 by determining that the bus is free. This determination may be based upon signaling on the bus. For example, in one embodiment a steady logic high value (e.g., VDD) on the data line of the bus indicates that no other entity has control of the bus. Next control passes to block 510 where the device may begin a bus communication by a START protocol (which may include a repeated start protocol). START is used to start communication after the bus is idle, for example, when data line and clock line are both at a logic high level, and a master/slave wants to start communication. In this case, one device (master or slave) pulls down the SDA line low, then after seeing the data line low, another device (slave/master) pulls the clock line low for a longer time as an indication of ACK. After that, bus communication starts. A Repeated START is used in cases of multiple data transfers of, e.g., 8 bit packets, such that after sending 8 bits, another 8 bits will transfer by sending repeated start signals as an indication that further data will be transferred.

As illustrated, many different types of communications may occur on the bus. Such communications may include native communications according to an I3C protocol, a high speed differential communication as described herein according to an extended I3C protocol, or I²C communication protocol. Of course understand that embodiments may leverage an interconnect such as the I3C bus described herein to communicate according to other protocols, e.g., by way of multiplexing and/or tunneling, such that the expense of additional pins for a given processor or other SoC can be avoided. As such, communication according to other communication protocols may occur via tunneling within packets such as described with regard to FIG. 5, so that various entities can multiplex use of a single interconnect (and single set of pin structures) to reduce consumption of chip real estate.

Starting with the leftmost path of FIG. 5, assume that a communication is to be a legacy I²C message. In this instance, a given message such as a read (R), write (W) or acknowledgment (ACK) may be communicated by issuing a header packet with a static address for a given device to which the communication is directed (block 520). Thereafter, depending upon the type of communication, data and/or an ACK can be communicated (block 522). Note that at a conclusion of a communication, a DONE message may be issued to indicate no further communication, causing both data and clock lines to drive high. Or in case of an error, an I²C no acknowledge (NACK) may be sent and control passes to block 590 where a STOP or REPEATED START may occur. Depending upon which event occurs, control passes back to block 505 or block 510.

For an I3C (e.g., SDR) message, control passes from block 510 to block 530 where a message header can be sent for a given type of message (e.g., R, W or ACK). Note that this communication according to the I3C protocol is with a dynamic address, since according to an I3C protocol, devices may be dynamically addressed to accommodate hot plug and other situations. Next control passes to block 532 where a data transmission may occur, which may continue until the communication is complete. At this point, control passes to block 590. Note also that it is possible for an I3C NACK to be sent directly from block 530 to block 590 if the slave does not properly acknowledge a communication.

Still with reference to FIG. 5, if instead a communication is an I3C SDR broadcast message, control passes to block 540 where a broadcast command is sent (e.g., having the value 7'h7E). Such broadcast command may be for write or ACK types of messages. After the broadcast command is sent, at block 542 a common command code (CCC) is sent for the broadcast. Thereafter, data may optionally be sent (block 544) until completed. Note that if a broadcast communication is of an ACK type, control may pass directly from block 540 to block 590. Also note that at the conclusion of a communication of write data at block 544, control passes to block 590.

Still with reference to FIG. 5, if instead a message is an I3C SDR direct message, control passes to block 550 where a broadcast command is sent. Next control passes to block 552, where a CCC for the direct message is sent. Thereafter at block 554 a repeated START may occur for each device of the communication. Then at block 556, a message header can be sent for a given type of message (e.g., R, W or ACK) with a dynamic address. Next a data transmission may occur at block 558, which may continue until the communication is complete. Note that if there is another slave device present for this communication, control passes back to block 554.

Finally with further reference to FIG. 5, if a communication is an I3C differential high speed communication as described herein, control passes to block 580 where a broadcast command is sent (e.g., having the value 7'h7E). Such broadcast command may be for write or ACK types of messages. Note that only the devices supporting HDR or SDR or SHDR will be able to detect this pattern. After the broadcast command is sent, control passes to block 582 where a common command code is sent to enter into the SHDR mode. In some embodiment, this common command code may have a predetermined value and be able to be decoded by both master and slaves. Note that these communications at blocks 580 and 582 occur according to a conventional I3C communication protocol, namely a single-ended communication of data via a data line (e.g., SDA) and communication of a corresponding clock signal via a clock line (SCL). Only slave devices that support this SHDR mode will be able to participate in arbitration and respond to this master communication.

In an embodiment, devices may send capability information (e.g., by sending capability information such as a bus characteristic register (BCR) information, e.g., [7:6] bits set to 10) as an indication of supporting SHDR mode. HDR-only devices will now stop communication after decoding the special command and wait for the next broadcast command. During SHDR mode, legacy devices (e.g., $I^2C$ devices) or SDR or HDR only mode devices will not be able to respond, as signaling is via asynchronous differential signaling at low voltage swings, which is logic low for both lines such that these devices will not be able to interrupt the bus during SDHR mode. As such, these legacy devices will not respond to these communications.

After this communication of the common command code for entry into the SHDR mode, control passes to block 584 where the differential high speed mode is entered. As such, communications at block 584 may be according to this enhanced I3C protocol in which communications occur differentially and at low voltage swing levels. In this way, these communications are only visible to and can only be detected by devices that are configured for communication according to this differential high speed signaling mode. Instead other devices simply identify a low logic level on the bus and cannot detect the contents of the communication. Note that in this differential high speed mode, the master may initiate communication by sending, differentially and at a low voltage swing, a predetermined entry pattern (which in one embodiment may be a bit pattern of 00011010). Thereafter, a data communication proceeds differentially (and also at the low voltage swing). At the conclusion of this data communication, a predetermined exit pattern may be sent (e.g., 0001111 in an embodiment). At this point, the master may release control of the bus and this differential high speed mode is exited to a STOP condition at block 590. Note that devices may start communication if sensed data is available by initiating communication, e.g., through an in-band interrupt (IBI) or hot plug mode. Understand while shown at this high level in the embodiment of FIG. 5, many variations and alternatives are possible.

Figure 6A:
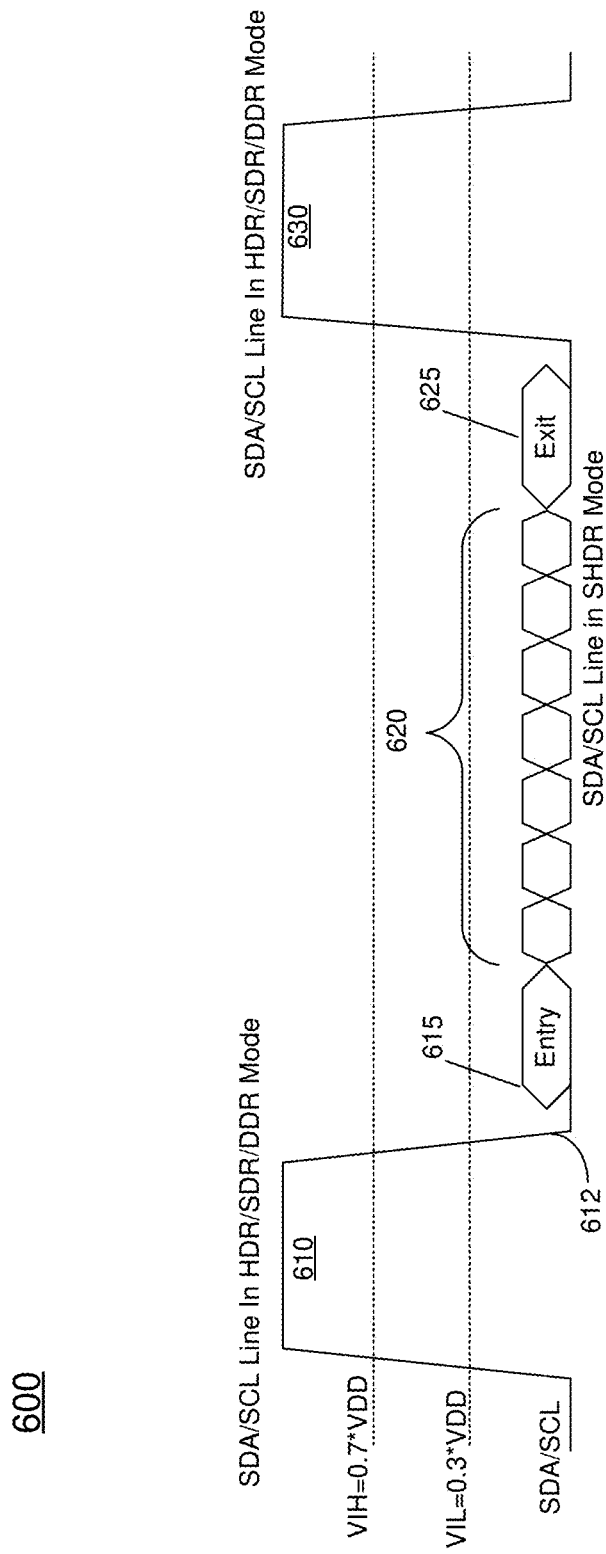
FIG. 6A is a graphical illustration of signaling waveforms for data communication according to a differential high speed mode in accordance with an embodiment of the present invention.

Referring now to FIG. 6A, shown is a graphical illustration of signaling waveforms for data communication according to a differential high speed mode in accordance with an embodiment of the present invention. As shown in FIG. 6A, illustration 600 includes communication via multiple lines of a bus, more specifically via SDA/SCL lines. As seen, when no device has control of the bus during a first time period 610, these lines are at a high voltage level (at a supply voltage level (e.g., VDD)). By convention, this is the idle bus state according to embodiments. As such, for a given device to take control of the bus, a bus controller of the device takes the data line of the bus low as illustrated at time 612.

Assume that this bus master successfully arbitrates for control of the bus and is capable of the differential high speed communication described herein. Accordingly the bus master sends appropriate pre-message signaling (such as a broadcast message and/or CCC command, dynamic address assignment, etc.) for this differential high speed mode. Then at time instant 615, an entry pattern is sent. Note that this communication occurs differentially at low voltages. In an embodiment, the swing of this signaling may be at levels below a low voltage threshold for the communication protocol. In an embodiment, the I3C protocol may proceed with two voltage thresholds for single-ended signaling: namely, signals greater than a upper threshold (VIH) (which in an embodiment may be set at 0.7 VDD) are considered as logic high values, and signals less than a lower threshold (VIL) (which in an embodiment may be set at 0.3 VDD) are considered logic low values.

However, for this differential high speed signaling as described herein, the voltage swing is smaller than this second, lower voltage threshold. In a particular embodiment, the voltage swing for the differential high speed communication described herein may be between approximately 100 millivolts (mV) to 300 mV. In one particular embodiment, the voltage swing can be limited to 0.3V differential swing for this mode. According to the I3C specification, multiple supplies including 1.2V, 1.8V or 3.3V are possible, VIL-min=0.31.12=0.336; so a maximum differential swing of 300 mV may be a safe limit with a lowest differential voltage swing of 100 mV, in one embodiment.

After the entry pattern is sent at time instant 615, a data communication may occur in this differential high speed mode during a time duration 620, after which a communication of the exit pattern occurs at times instant 625. Thereafter the bus master gives up control of the bus by letting the data line of the bus float again to the high voltage level at time instant 630. At this point, another bus entity (or the same bus master) may seek to obtain control of the bus. Understand while shown at this high level in the embodiment of FIG. 6A, many variations and alternatives are possible.

Figure 6B:
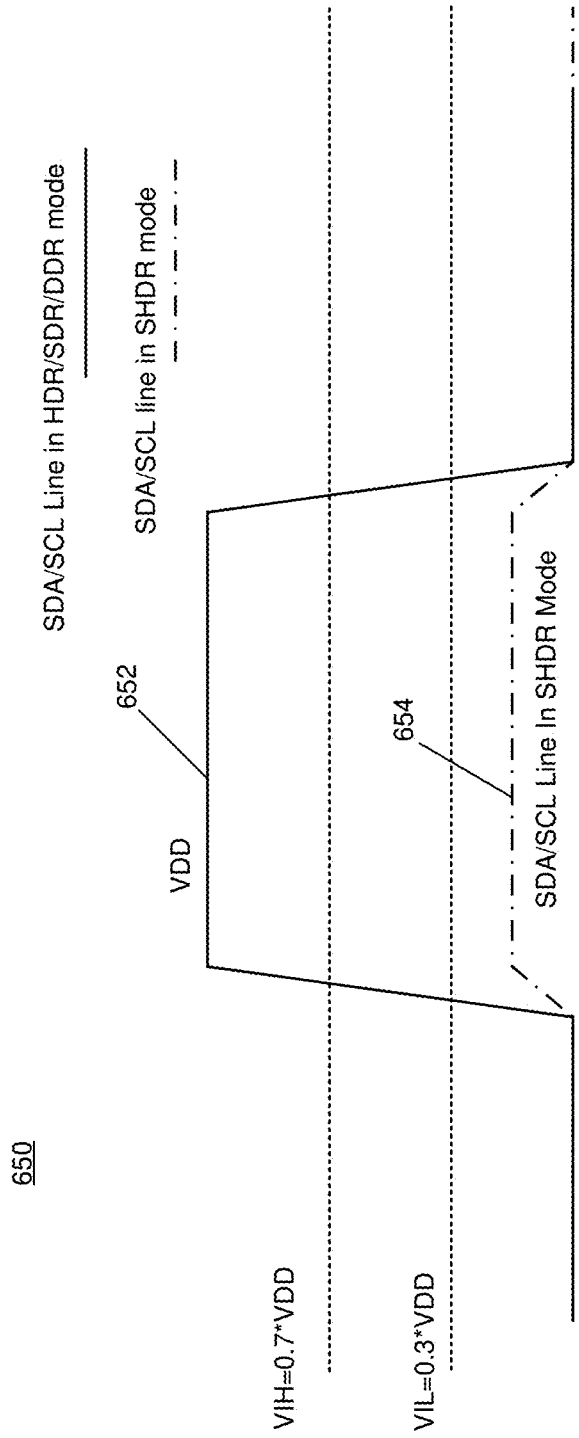
FIG. 6B is another graphical illustration of signaling waveforms in accordance with an embodiment of the present invention.

Referring now to FIG. 6B, shown is another graphical illustration of signaling waveforms. More specifically, FIG. 6B shows an illustration 650 of clock and data lines of the bus, and their maximum voltage swing in HDR/SDR/DDR modes (illustrated at waveform 652) and similarly, the voltage swing on clock and data lines in SHDR mode (illustrated at waveform 654). As seen, a much smaller voltage swing inheres in this mode of operation. In some embodiments, as this voltage swing may be between approximately 100 mV to 300 mV.

Note that similar techniques can be used for other protocols running up to 400 Mbps or more by use of other command code extensions, to reduce pin count. Embodiments in this way may meet future device needs (such as a future camera sensor AON requirement) for operating beyond currently available data rates of a multi-drop bus.

Example embodiments may be implemented in camera and automotive applications, among other applications, including long reach platform solutions such as an automotive vehicle computing system, appliance system or other IoT-based system. With the enhanced signaling described herein, more reliable communications may occur due to insensitivity towards a noisy environment, e.g., using differential communication. And, the low voltage swing enables future supply scalability, with an ability to operate at low voltage swings, e.g., sub-1.2v.

Figure 7:
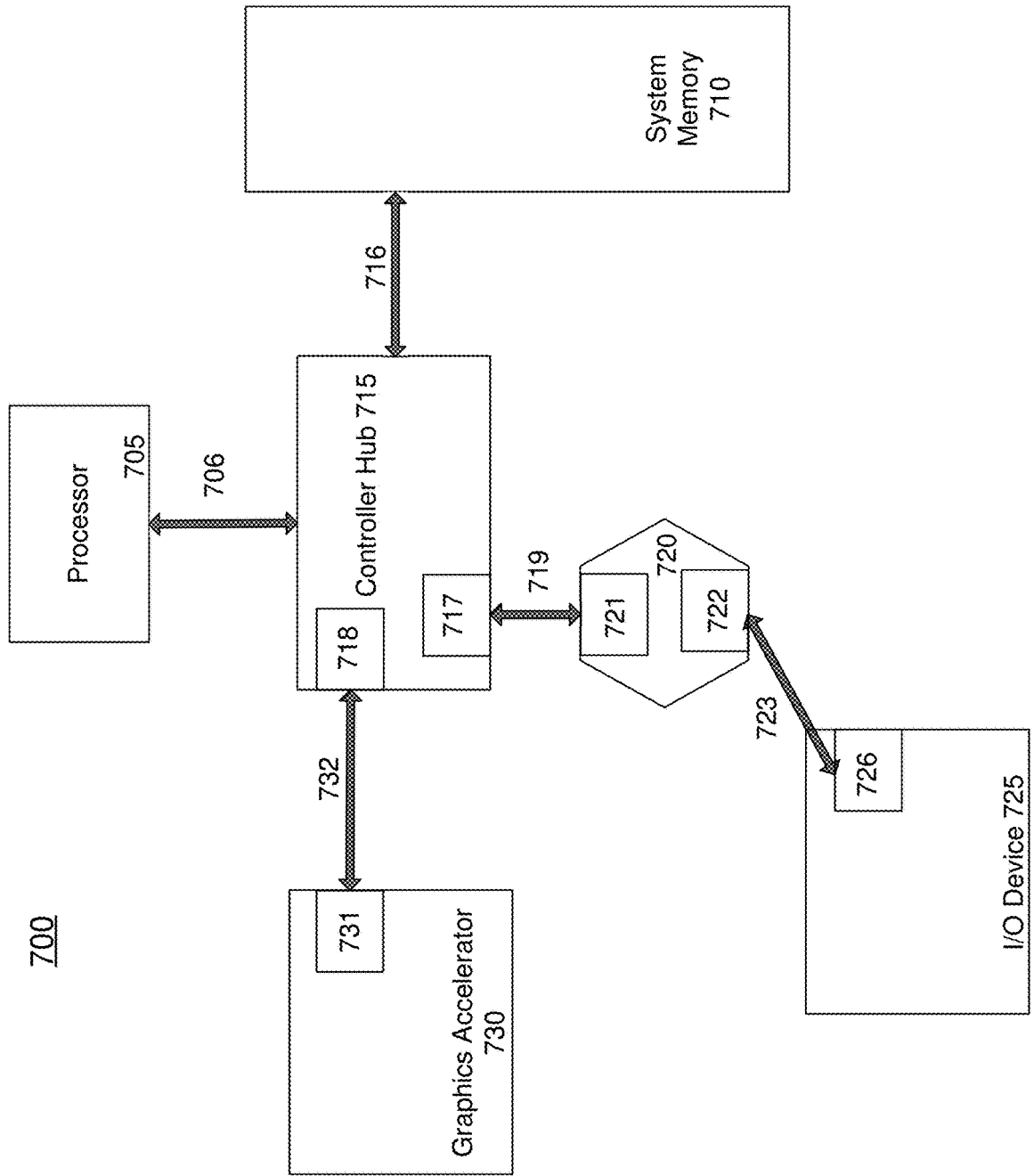
FIG. 7 is an embodiment of a fabric composed of point-to-point links that interconnect a set of components.

Embodiments may be implemented in a wide variety of interconnect structures. Referring to FIG. 7, an embodiment of a fabric composed of point-to-point links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect. In another embodiment, link 706 includes a parallel serial, differential interconnect architecture that is compliant with different interconnect standards, and which may couple with one or more host controllers to perform delay determination and clock adjustments as described herein.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a PCIe interconnection hierarchy. Examples of controller hub 715 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may operate in multiple modes, including the differential modes described herein. Often in the PCIe vernacular, such a device is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. A graphics controller or the graphics accelerator 730 itself may be integrated in processor 705.

Figure 8:
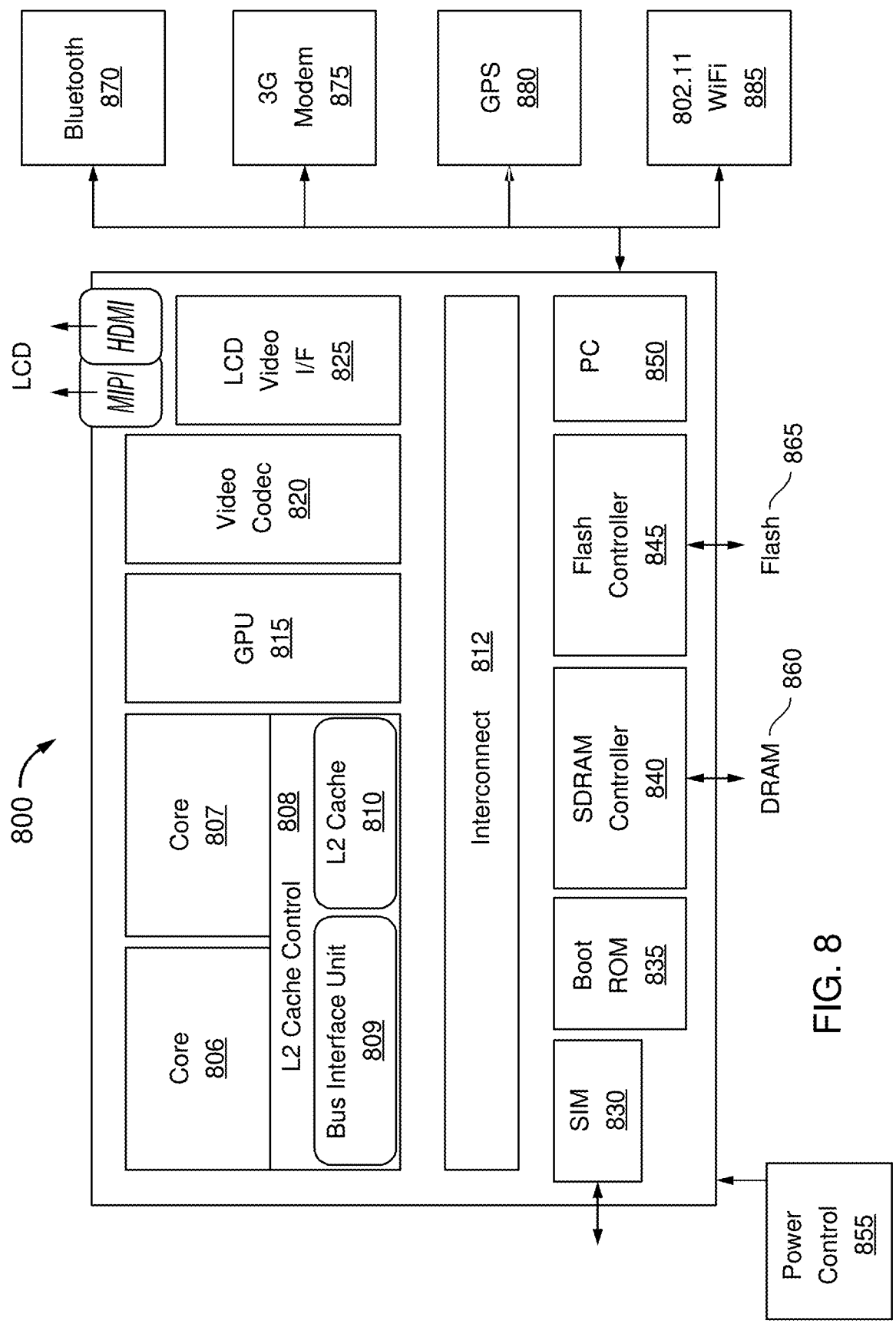
FIG. 8 is an embodiment of a system-on-chip design in accordance with an embodiment.

Turning next to FIG. 8, an embodiment of a SoC design in accordance with an embodiment is depicted. As a specific illustrative example, SoC 800 may be configured for insertion in any type of computing device, ranging from portable device to server system. Here, SoC 800 includes 2 cores 806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800 via an interconnect 812.

Interconnect 812 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g., DRAM 860), a flash controller 845 to interface with non-volatile memory (e.g., flash 865), a peripheral controller 850 (e.g., an eSPI interface) to interface with peripherals, video codecs 820 and video interface 825 to display and receive input (e.g., touch enabled input), GPU 815 to perform graphics related computations, etc. Any of these interconnects/interfaces may incorporate aspects described herein, including the ability to communicate according to multiple modes, including the differential high speed, low swing communications described herein. In addition, the system illustrates peripherals for communication, such as a Bluetooth module 870, 3G modem 875, GPS 880, and WiFi 885. Also included in the system is a power controller 855.

Figure 9:
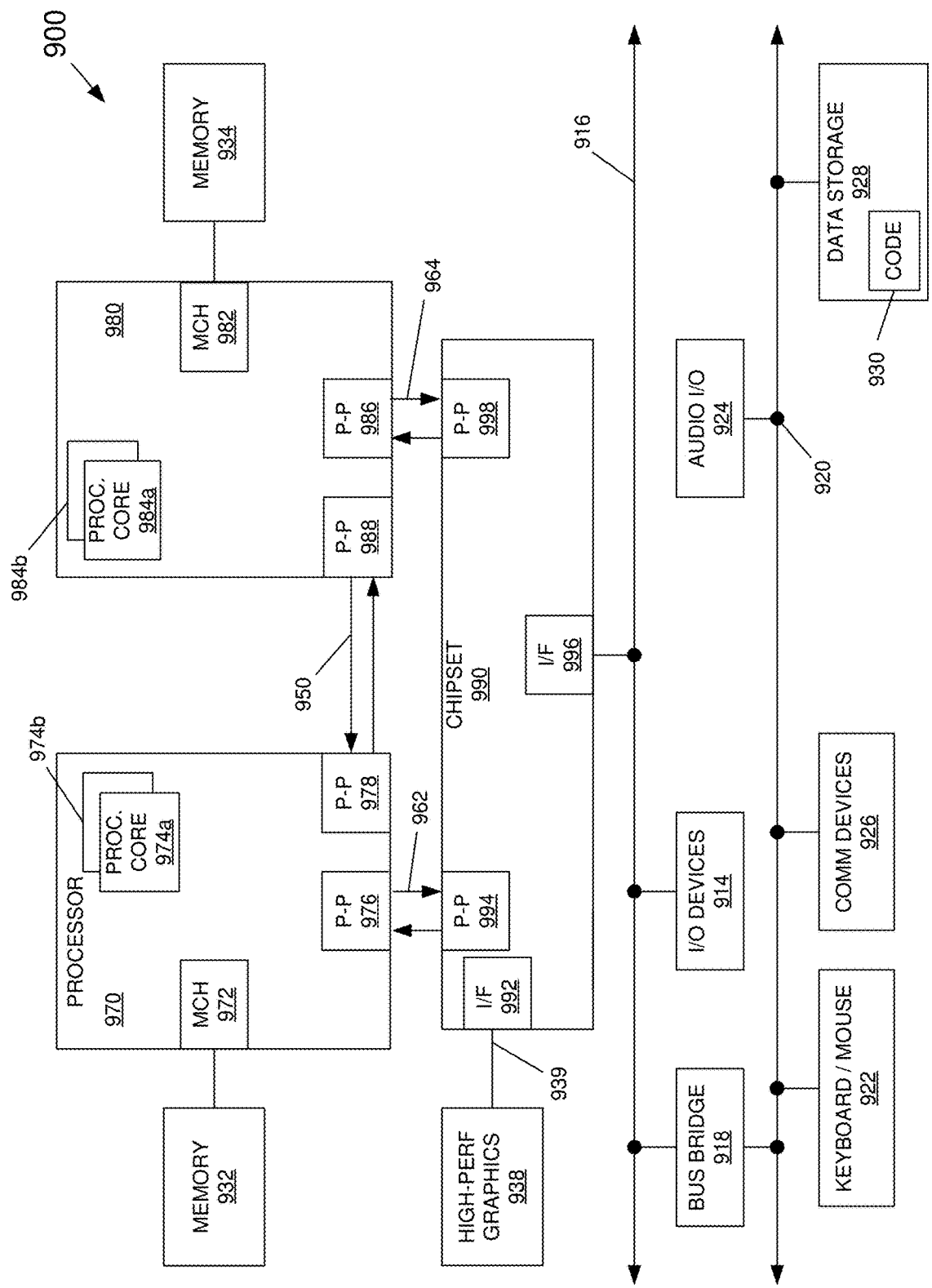
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 900 includes a first processor 970 and a second processor 980 coupled via a point-to-point interconnect 950. As shown in FIG. 9, each of processors 970 and 980 may be many core processors including representative first and second processor cores (i.e., processor cores 974a and 974b and processor cores 984a and 984b).

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 964, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Any of the devices shown in FIG. 9 may be configured to perform bus master activities (including the mode selection and control) for one or more of the interconnect structures, as described herein.

The following examples pertain to further embodiments.

In one example, an apparatus comprises: a host controller to couple to an interconnect to which a plurality of devices may be coupled. The host controller may include: a first driver to drive first information onto a first line of the interconnect; a second driver to drive a clock signal onto a second line of the interconnect; and a mode control circuit to cause the second driver to drive the clock signal onto the second line of the interconnect in a first mode and to cause the first driver and the second driver to drive differential information onto the first line and the second line of the interconnect in a second mode.

In an example, the host controller comprises a table having a plurality of entries each to store capability information for one of the plurality of devices, the capability information having an indicator to indicate whether the device is able to communicate according to the second mode.

In an example, the second mode comprises a differential mode, where a native communication protocol of the interconnect comprises a single-ended protocol.

In an example, the host controller comprises a write controller to communicate the differential information under control of the mode control circuit, where the write controller is to communicate the differential information at a voltage swing less than a low voltage threshold level for the interconnect.

In an example, the host controller further comprises: a first receiver to receive third information via the first line of the interconnect; a second receiver to receive a second clock signal via the second line of the interconnect; and in the first mode, the mode control circuit is to cause the first receiver to receive the third information via the first line and cause the second receiver to receive the second clock signal via the second line, and in the second mode, the mode control circuit to cause the first receiver and the second receiver to receive second differential information via the first line and the second line.

In an example, the host controller is to send a first common control code along the first line to cause one or more of the plurality of devices to enter into the differential mode.

In an example, after the first common control code is sent, the host controller is to send an entry pattern via the first line of the interconnect and the second line of the interconnect.

In an example, the host controller is to send the entry pattern differentially at a voltage swing smaller than a low voltage threshold of the interconnect.

In an example, after the entry pattern is sent, the host controller is to send a message via the first and second lines of the interconnect at a voltage swing smaller than a low voltage threshold for the interconnect.

In an example, after the message is sent, the host controller is to send an exit pattern via the first and second lines, to cause the one or more devices to exit the differential mode.

In an example, the host controller is to send the message in the differential mode in a manner that is not visible to one or more other devices of the plurality of devices, the one or more other devices not configured for the differential mode.

In an example, the host controller further comprises a selection circuit to receive the clock signal and at least a portion of the differential information and to send the first clock signal in the first mode and to send a portion of the differential information in the second mode, via the second line of the interconnect.

In another example, a method comprises: sending a command code on a data line of an interconnect to indicate transition of the interconnect into a differential communication mode; sending a differential entry pattern on the data line and a clock line of the interconnect; and thereafter sending a message differentially on the data line and the clock line of the interconnect, where a native communication protocol for the interconnect is a single-ended communication protocol.

In an example, the method further comprises sending the data differentially at a voltage swing smaller than a low voltage threshold of the interconnect.

In an example, the method further comprises sending the data differentially at a first data rate, the first data rate greater than available data rates for the native communication protocol.

In an example, the method further comprises identifying at least one device coupled to the interconnect having a capability to handle differential data.

In an example, the method further comprises sending the data differentially at a voltage swing smaller than a low voltage threshold of the interconnect to be received and handled by the at least one device, where the data is not visible to at least one other device coupled to the interconnect, the at least one other device not configured to handle differential data.

In another example, a system comprises a first device having a bus controller to couple to a bus and to be a master controller for the bus and to cause data to be communicated on the bus, a first transceiver coupled to a first line of the bus, and a second transceiver coupled to a second line of the bus. In a first mode, the first transceiver is to communicate single-ended data via the first line of the bus and the second transceiver is to communicate a clock signal via the second line of the bus, and in a second mode the first transceiver and the second transceiver are to communicate differential data via the first line and the second line. The system further includes, in an example, the bus coupled to the first device, a second device coupled to the bus, where the second device is to participate in communication with the first device in at least the first mode, and a third device coupled to the bus, where the third device is to participate in communication with the first device in at least the second mode.

In an example, in the second mode, the bus controller is to send a first broadcast message via the bus to indicate an upcoming communication, send a second broadcast message to configure at least the third device for the second mode, and where in the second mode, the communication between the device and the third device is to occur at a voltage swing level that is not visible to the second device.

In an example, a native communication protocol of the bus comprises a single-ended protocol and the first transceiver and the second transceiver are to communicate the differential data at a voltage swing lower than a voltage swing of the native communication protocol and at a speed higher than available speeds of the native communication protocol.

In another example, an apparatus comprises: means for sending a command code on a data line of an interconnect means to indicate transition of the interconnect means into a differential communication mode; means for sending a differential entry pattern on the data line and a clock line of the interconnect means; and means for sending a message differentially on the data line and the clock line of the interconnect means, where a native communication protocol for the interconnect means is a single-ended communication protocol.

In an example, the apparatus further comprises means for sending the data differentially at a voltage swing smaller than a low voltage threshold of the interconnect means.

In an example, the apparatus further comprises means for sending the data differentially at a first data rate, the first data rate greater than available data rates for the native communication protocol.

In an example, the apparatus further comprises means for identifying at least one device coupled to the interconnect means having a capability to handle differential data.

In an example, the apparatus further comprises means for sending the data differentially at a voltage swing smaller than a low voltage threshold of the interconnect means, where the data is not visible to at least one other device coupled to the interconnect means, the at least one other device not configured to handle differential data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first driver to drive first information onto a first line of an Improved Inter Integrated Circuit (I3C) bus;
a second driver to drive a clock signal onto a second line of the I3C bus; and
a mode control circuit to cause the first driver to drive first data information onto the first line of the I3C bus and cause the second driver to drive the clock signal onto the second line of the I3C bus in a single-ended manner in a first mode, and to cause the first driver and the second driver to drive differential data information onto the first line and the second line of the I3C bus in a differential manner in a second mode.

2. The apparatus of claim 1, wherein the second mode comprises a differential mode and a native communication protocol of the I3C bus comprises a single-ended protocol.

3. The apparatus of claim 1, wherein the apparatus does not drive the clock signal onto the I3C bus in the second mode.

4. The apparatus of claim 1, wherein the second mode comprises a super high data rate (SHDR) mode.

5. The apparatus of claim 1, wherein the apparatus comprises a host controller to be a bus master for the I3C bus.

6. The apparatus of claim 5, wherein the host controller comprises a storage to store a table having a plurality of entries each to store capability information for one of a plurality of devices, the capability information to indicate whether the device is able to communicate according to the second mode.

7. The apparatus of claim 1, wherein the apparatus is to communicate the differential data information at a voltage swing less than a low voltage threshold level for the I3C bus.

8. The apparatus of claim 1, wherein the apparatus is to send a first common control code along the first line of the I3C bus to cause one or more of a plurality of devices to enter into the second mode.

9. The apparatus of claim 8, wherein after the first common control code is sent, the apparatus is to send an entry pattern via the first line of the I3C bus and the second line of the I3C bus.

10. The apparatus of claim 9, wherein the apparatus is to send the entry pattern differentially at a voltage swing smaller than a low voltage threshold of the I3C bus.

11. The apparatus of claim 9, wherein, after the entry pattern is sent, the apparatus is to send a message via the first and second lines of the I3C bus at a voltage swing smaller than a low voltage threshold of the I3C bus.

12. The apparatus of claim 11, wherein after the message is sent, the apparatus is to send an exit pattern via the first and second lines of the I3C bus, to cause the one or more of the plurality of devices to exit the second mode.

13. A method comprising:
sending a command code on a data line of an Improved Inter Integrated Circuit (I3C) bus in a single-ended manner to indicate transition of the I3C bus into a differential communication mode;
sending a differential entry pattern on the data line and a clock line of the I3C bus in a differential manner; and
thereafter sending a message comprising differential data information differentially, at a voltage swing smaller than a low voltage threshold, on the data line and the clock line of the I3C bus.

14. The method of claim 13, further comprising sending the message comprising the differential data information differentially at a first data rate, the first data rate a super high data rate.

15. The method of claim 13, further comprising receiving a capability message from at least one device coupled to the I3C bus to indicate a capability for the differential communication mode.

16. The method of claim 15, further comprising sending the message to the at least one device with an address of the at least one device.

17. The method of claim 13, further comprising after sending the message, raising the data line of the I3C bus to a supply voltage level to release the I3C bus.

18. A system comprising:
a first device having:
a first transceiver coupled to a data line of an Improved Inter Integrated Circuit (I3C) bus;
a second transceiver coupled to a clock line of the I3C bus; and
wherein in a first mode the first transceiver is to communicate single-ended data via the data line of the I3C bus and the second transceiver is to communicate a clock signal via the clock line of the I3C bus, and in a second mode the first transceiver and the second transceiver are to communicate differential data at a voltage swing lower than a voltage swing of the I3C bus via the data line and the clock line;
the I3C bus coupled to the first device;
a second device coupled to the I3C bus, wherein the second device is to participate in communication with the first device in at least the first mode; and
a third device coupled to the I3C bus, wherein the third device is to participate in communication with the first device in at least the second mode.

19. The system of claim 18, wherein, in the second mode, the first device is to send a first broadcast message via the I3C bus to indicate an upcoming communication, and send a second broadcast message to configure at least the third device for the second mode, the second mode comprising a super high data rate mode.

20. The system of claim 18, wherein the second device comprises an $I^2C$ device, wherein communication in the second mode is transparent to the second device.

* * * * *